July 19, 1949.   P. READ   2,476,910
PLANT TOPPING MACHINE
Filed March 24, 1947   4 Sheets-Sheet 1
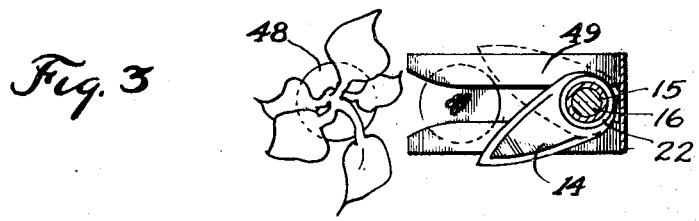
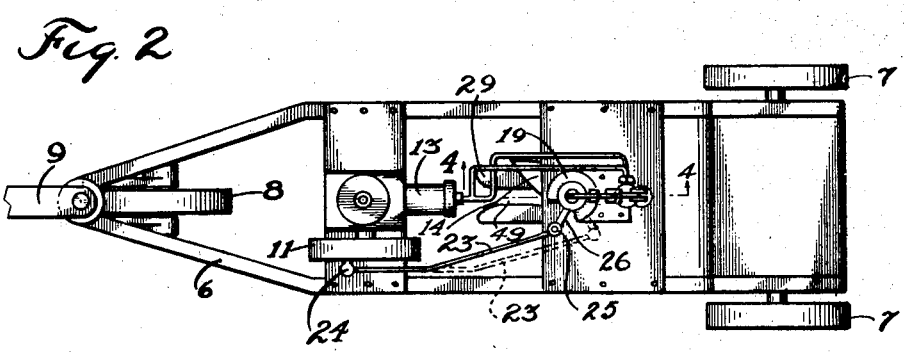
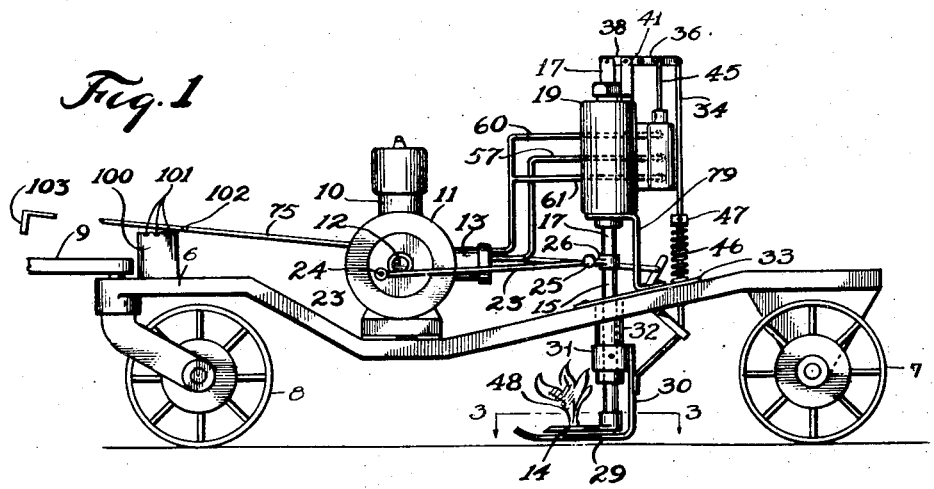
Inventor
PAUL READ July 19, 1949.  P. READ  2,476,910
PLANT TOPPING MACHINE
Filed March 24, 1947  4 Sheets-Sheet 2
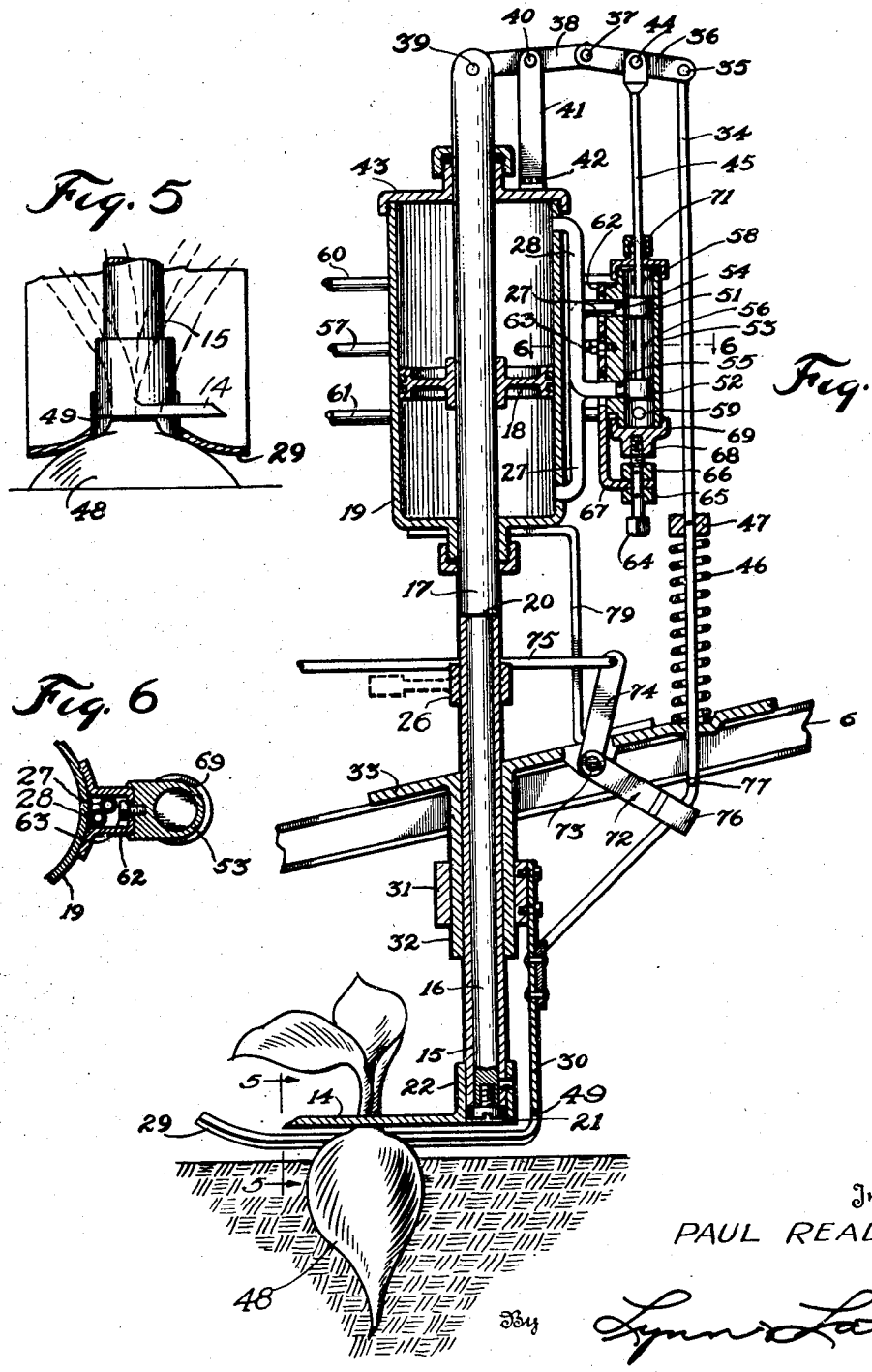
Inventor
PAUL READ
By Lynn Latta
Attorney

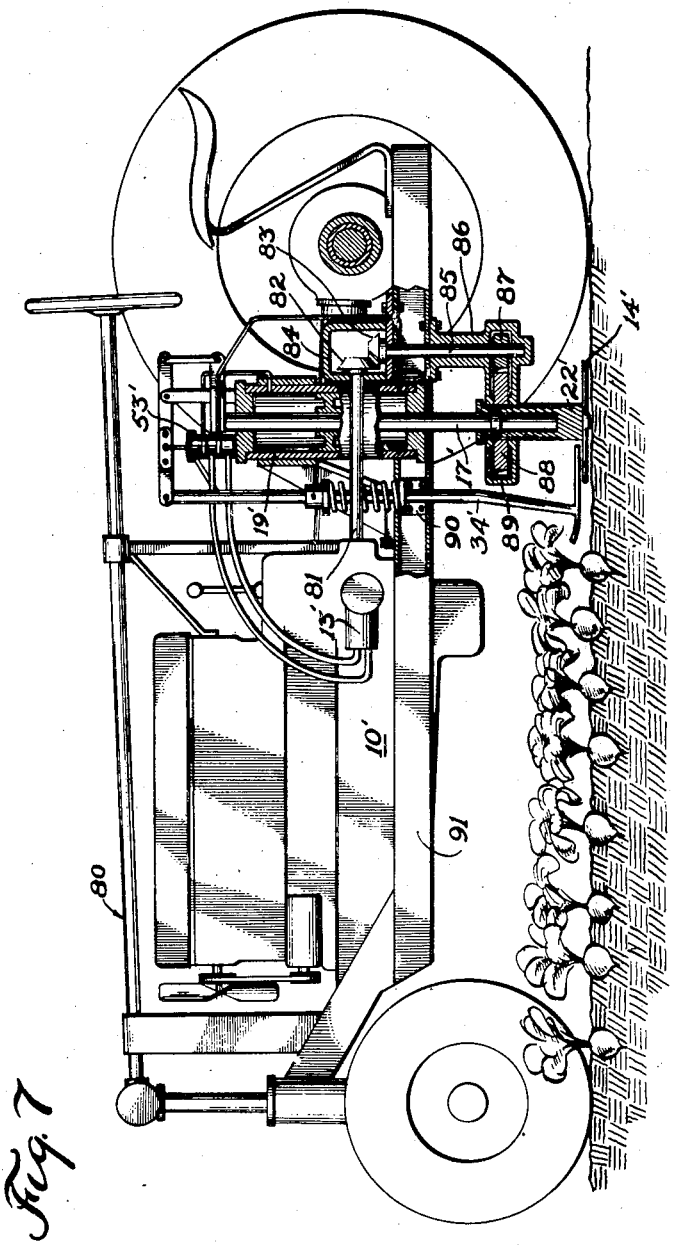

July 19, 1949.　　　　P. READ　　　　2,476,910
PLANT TOPPING MACHINE
Filed March 24, 1947　　　　4 Sheets-Sheet 4
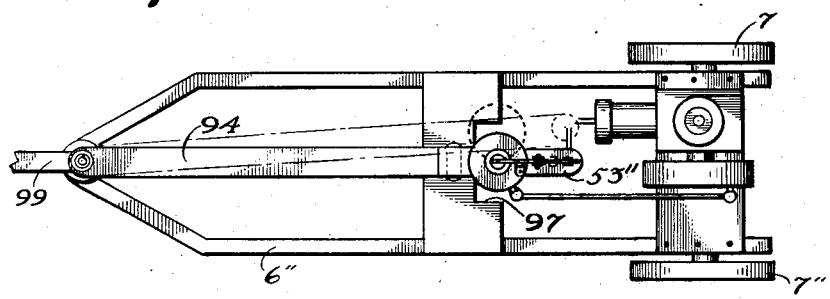
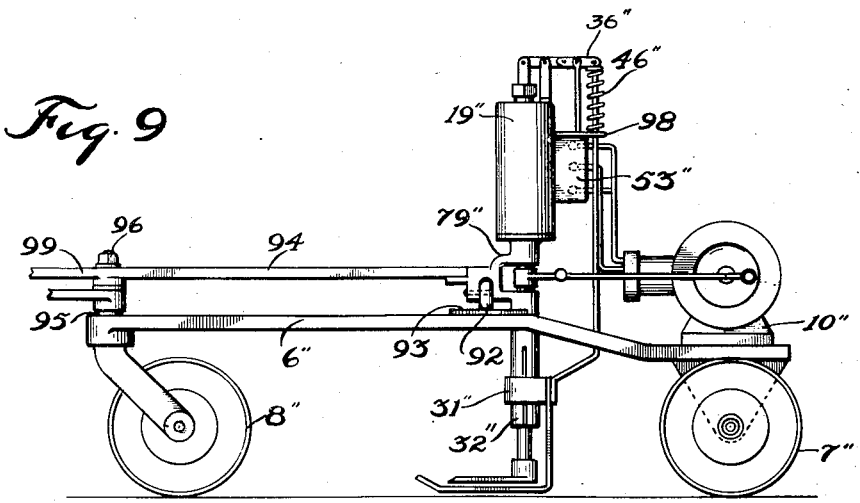
INVENTOR.
PAUL READ
BY Lymon Latta
ATTORNEY Patented July 19, 1949

2,476,910

UNITED STATES PATENT OFFICE 2,476,910

PLANT TOPPING MACHINE

Paul Read, North Redondo Beach, Calif.

Application March 24, 1947, Serial No. 736,700

9 Claims. (Cl. 56—121.4)

This invention relates to a machine for topping beets in the field. The primary object of the invention is to provide a machine having a cutting knife that is automatically controlled in such a manner that it will cut the tops from all beets substantially uniformly, even though some beets may project farther from the ground than others.

The invention is characterized by the employment of a sensing device for determining the height of the beets and thereby controlling the height of the cutting knife as it passes over the beets.

While it has been previously proposed to provide a cutting device adapted to ride over the beets and to adjust its vertical position as the result of contact with the beets, such devices in general are unsatisfactory for the reason that they damage the beet by bruising it. My invention aims to avoid this objectionable characteristic by providing a sensing device that will rest very lightly upon the beet without exerting pressure thereagainst and, at the same time, positively control the vertical positioning so as to effectively slice through the beet at exactly the proper height without skidding upwardly as it strikes the beet.

Another object of my invention is to provide a beet topping machine having power-operated means for raising and lowering a cutting blade and also for giving the blade a cutting motion.

A further object is to provide a beet topping machine having means for automatically adjusting the vertical height of the cutting blade in combination with manual over-control means for raising the blade to an inoperative position at the end of a row or when transporting the machine to and from a field.

While the invention is particularly applicable to the topping of sugar beets, it is also within the purview of the invention to employ a topping machine having my improved characteristics in other types of agricultural cutting implements and it is to be understood that such mechanisms come within the scope of the invention.

Other objects of the invention will become apparent in the ensuing specifications and appended claims in connection with the appended drawings, in which:

Fig. 1 is a side view of a topping machine embodying my invention;

Fig. 2 is a plan view of the same;

Fig. 3 is a detail horizontal sectional view taken on the line 3—3 of Fig. 1;

Fig. 4 is a vertical detail sectional view taken on the line 4—4 of Fig. 2;

Fig. 5 is a detail sectional view of the sensing device, taken on the line 5—5 of Fig. 4;

Fig. 6 is a detail sectional view of the control valve, taken on the line 6—6 of Fig. 4;

Fig. 7 is a side view, partially in section, of a topping machine embodying my invention, incorporated in a tractor implement;

Fig. 8 is a plan view of a beet topping machine embodying another modified form of the invention; and Fig. 9 is a side view of the machine shown in Fig. 8.

As an example of one form in which my invention may be embodied, I have shown in Figs. 1 to 4 inclusive a topping machine, including a carriage 6 supported upon rear wheels 7 and a dirigible front wheel 8 and adapted to be drawn from a suitable tractor device through a draw bar 9.

My invention utilizes a power plant 10 which may comprise a small gasoline engine having a fly wheel 11 and a crankshaft 12 which may operate a piston (not shown) in a small hydraulic pump 13 connected to the engine 10.

A cutting knife 14 is secured to the lower end of a tubular shaft 15 which is journaled upon a reduced shaft portion 16 of a shaft 17 which is supported by a piston 18 in a cylinder 19. The piston 18 and cylinder 19 constitute a servomotor for raising and lowering the blade 14. The tubular shaft 15 is oscillatable on the shaft portion 16 and is supported between a shoulder 20 formed at the junction between the shaft 17 and reduced shaft portion 16, and an end cap 21 which may be threaded into the shaft portion 16 or otherwise secured thereto. The blade 14 may include a hub portion 22 secured to the tubular shaft 15 and enclosing the end cap 21 so that the latter may be flush with or above the lower surface of the blade 14.

The blade 14 receives oscillatory movement from the fly wheel 11 through a connecting rod 23 having one end pivoted to a crank pin 24 on the fly wheel 11 and its other end pivoted at 25 to an arm 26 which is secured to the tubular shaft 15. Supported on the shaft portion 16 by the end cap 21, the tubular shaft 15 may oscillate while the shaft 17 remains stationary. At the same time, the tubular shaft 15 and blade 14 will move vertically with the piston 18 which is moved vertically in the cylinder 19 by hydraulic fluid delivered to the cylinder 19 through hydraulic lines 27 and 28.

The vertical positioning of the piston 18 is controlled by sensing mechanism including a foot 29 having a leg 30 extending upwardly and provided with a bearing 31 that is vertically slideable on a bearing 32 but keyed thereto so as to be held against rotation. The sleeve 32 depends from a cross frame member 33 forming part of the frame of the carriage 6. The tubular shaft 15 is extended through the bearing sleeve 32 and is both vertically slideable and oscillatable therein.

The sensing mechanism includes a rod 34, the upper end of which is pivoted at 35 to a rock lever 36. The other end of the lever 36 is pivoted, at 37, to a second rock lever 38. The other end of the rock lever 38 is pivoted, at 39, to the upper end of the shaft 17. The intermediate portion of the lever 38 is fulcrumed at 40 on a suitable bracket 41 which may be secured as at 42 to the head 43 of the cylinder 19. The intermediate portion of the rock lever 36 is pivoted, at 44, to the upper end of a valve rod 45.

The weight of the sensing mechanism is carried largely by a coil spring 46, engaged under slight compression between the frame member 33 and a collar 47 on the rod 34. The spring 46 is light enough so that the weight of the sensing mechanism may carry it to its lowermost position, compressing the spring 46, and relieving the major portion of the weight of the sensing mechanism from the shoulders of a beet plant 48 engaged by the sensing mechanism. The foot 29 has a central slot 49 extending longitudinally throughout its length and extending part way up into the leg member 30. The spaced, parallel runners defining the respective sides of the slot 49 are adapted to ride upon the shoulders of a beet 48 and to shift the rod 34 vertically to a position corresponding to the height to which the beet 48 projects from the ground. Such vertical shifting movement of the rod 34 is transmitted to the valve rod 45 so as to shift a pair of valve pistons 51, 52, vertically in a valve cylinder 53. The cylinder 53 has a pair of outlet ports 54, 55, normally registering with and closed by the pistons 51, 52. The cylinder 53 also has an inlet port 56 through which hydraulic fluid under pressure is pumped into the cylinder 53 from the pump 13 through an inlet line 57. The cylinder 53 also has upper and lower exhaust ports 58, 59, through which hydraulic fluid may be returned to the pump 13 by way of return lines 60, 61, respectively.

The cylinder 53 is mounted for vertical adjustment on a bracket 62 secured to the servomotor cylinder 19. The cylinder 53 may be secured to the bracket 62 by a bolt 63 extending through a vertical slot in the bracket 62. Vertical adjustment may be provided by an adjusting screw 64 having secured thereto collars 65, 66 embracing an ear 67 on the lower end of the bracket 62, with the screw 64 passing through the ear 67 and threaded into a boss 68 on the lower end cap 69 of the cylinder 53. The upper end of the cylinder 53 may be closed by a cap 70 having a suitable packing gland 71 to provide for passage of the valve rod 45 through the cap while sealing the rod.

Manual raising of the sensing mechanism may be provided for by a bell crank lever 72 fulcrumed at 73 to the frame member 33 and having an upwardly extending arm 74 linked to a control rod 75 which in turn may extend forwardly to the seat of the tractor device. The end of the bell crank lever 72 may be provided with a fork 76 embracing the rod 34 and adapted to engage a lug 77 projecting laterally from the rod 34. The normal position of the bell crank lever 76 may be such as to avoid interference with normal vertical movement of the rod 34 as the mechanism operates automatically. Pulling the control rod 75 forwardly will raise the fork 76 into engagement with the lugs 77, thereby raising the rod 34.

In the operation of my improved beet topper, the machine is hauled or driven over a row of beets with the respective halves of the shoe 29 straddling the stem portions of the beets, as indicated in Fig. 3. The shoe 29 will ride upon the shoulders of each succeeding beet with a very light pressure owing to the action of the spring 46 in supporting a majority of the weight of the sensing mechanism. The vertical position of the sensing device, effected by the riding of the shoe 29 on the beet 48, will be reflected in the positioning of the pivot 35 of the rocker arm 36. If the pivot 35 moves upwardly, the pivot 44 will correspondingly move upwardly, shifting the piston 51, 52 slightly out of register with ports 54, 55 in the upward direction. This will cause pressure fluid from the chamber between the pistons 51, 52 delivered to said chamber through the inlet pipe 57 to pass through the tube 27 into the lower portion of the cylinder 19, moving the piston 18 upwardly and thus carrying the blade 15 upwardly. The upward movement of piston rod 17 will oscillate the rocker arm 38 clockwise, as viewed in Fig. 4, shifting pivot 37 downwardly and correspondingly shifting pivot 44 downwardly until the pistons 51, 52 are again in register with the ports 54, 55. Thus a balance will be reached in a new position of the mechanism, in which the blade 14 will have been raised an amount to correspond to the raising of the shoe 29 by contact with the beet. Consequently, the blade 14 will bear a constant relationship to the beet, and will uniformly slice off the top at the proper distance from the shoulders of the beet.

Downward movement of the sensing mechanism will be accompanied by downward movement of the pistons 51, 52, causing pressure fluid to flow from the upper chamber of cylinder 53 through tube 28 into upper chamber of cylinder 19, moving piston 18 downwardly. Such downward movement of the piston 18, communicated to shaft 17, will lower the cutter 14 and, simultaneously, cause upward movement of the valve 45 until the pistons 51, 52 have reclosed the ports 54, 55.

By shifting the manual control rod 75 forwardly, the bell-crank lever 72 will be shifted upwardly to bring the fork 76 into engagement with the projection 77 on the rod 34, raising the rod 34, runner 29 and blade 14 to elevated, inoperative positions.

The cylinder 19 is fixedly supported upon a frame 6, as by means of a bracket 79 secured to the plate 33.

The manual control means may include a lock for holding the sensing mechanism in an elevated position, or in a selected one of several elevated positions. Merely as an example of one possible means for accomplishing this result, I have shown in Fig. 1 a keeper bracket 100 projecting upwardly from the frame 6 and having at its upper end a plurality of notches 101 in any one of which a lug 102 on the rod 75 may be engaged. I have also shown, on the forward end of the rod 75, a handle 103 for operating the manual control mechanism. The handle 103 will be positioned at a point convenient to the operator seated on the tractor which draws the vehicle 6, 7, 8.

In the form of the invention shown in Fig. 7, the rod 34' is located forwardly of the cutter shaft 17'. The cutter blade 14' is a rotary disctype blade, and is carried by a hub 22' that is rotatably supported on the lower end of the shaft 17'. The cutter blade 14' is driven from the engine 10' of a tractor-type vehicle 80 (in which the mechanism of this form of the invention is directly incorporated) through a power take-off shaft 81, bevel gears 82 and 83 in a gear casing 84, a shaft 85 extending downwardly through a housing 86, a pinion 87 on the lower end of the shaft 85, and a gear 88 meshing with the pinion 87 and splined upon the hub 22' so that the latter may shift vertically through the gear 88 while being driven thereby. The pinion 87 and gear 88 are confined in a gear casing 89 forming an extension of the housing 86. The cylinder 19' and spring abutment bracket 90, as well as the gear casing 84 and housing 86, 89, are supported in the chassis frame 91 of the tractor 80. Pump 13' is driven directly from the engine 10' by a suitable gearing connection to the power take-off shaft 81, or directly to the driven shaft of the engine 10'. The pilot valve cylinder 53' is, in this form of the invention, shown as being mounted on the top of the cylinder 19' instead of on the side. The remainder of the mechanism of my invention is the same as that shown in Figs. 1 to 4 inclusive, and the parts thereof are designated by the same reference numerals. In the form of the invention shown in Figs. 8 and 9 respectively, the engine 10'' is located at the rear end of the frame 6'', and the servomotor 19'' is mounted on a bracket 79'' which carries a roller 92 by means of which the weight of the cylinder 19'' and associated parts is supported upon a plate 93 against which the roller 92 may roll so as to permit the cylinder 19'' and associated parts to shift laterally. The upright position of the cylinder 19'' and associated parts is maintained by a drag link 94 to the rear end of which the bracket 79'' is rigidly secured. The forward end of the drag link 94 is pivoted upon the upper end of the pivot shaft 95 of the caster wheel 8'' and is secured by any suitable means such as, for example, a nut 96 threaded upon the upper end of the pivot shaft 95.

The bearing sleeve 32'' on which the bushing 31'' of the sensing mechanism is vertically slidable, is either an integral part of or rigidly connected to the bracket 79'', whereby the runner 29 and cutter 14 will be shifted laterally with the cylinder 19''. Lateral limits of such shifting movement may be determined by the engagement of the bearing sleeve 32'' with the extremities of a notch 97 in the plate 93 through which the sleeve 32'' extends.

The spring 46'' which supports the sensing mechanism is, in this form of the invention, interposed between the outer end of lever 36 and a bracket 98 which is secured to the upper end of the pilot cylinder 53''.

In the operation of the invention shown in Figs. 8 and 9, the cutter and sensing mechanism are free to shift laterally so as to follow a row automatically. Any slight deviations in the row would cause the runner to automatically shift laterally so as to follow the row. To this end, the slot between the runners 29 may be flared outwardly toward the forward end of the runner as indicated in dotted lines in Fig. 8.

The automatic lateral shifting of the sensing mechanism may be supplemented by manual control. This may be accomplished through the medium of a manual control lever 99 rigidly connected to the drag bar 94 and projecting forwardly to a point where it is accessible to the driver of the tractor which pulls the vehicle 6'', 7'' and 8''.

I claim:

1. In a machine for topping tuberous plants, sensing mechanism comprising a foot adapted to ride over the tuberous part of a plant and to shift vertically to assume a position corresponding to the extent of projection thereof from the ground, an arm on the lower end of which said foot is carried, said arm projecting upwardly from the foot, a support, resilient means interposed between said support and said arm and supporting the sensing mechanism for riding movement of the foot over the tuberous part of a plant with very light pressure against said tuberous part and for vertical movement of the foot to assume a position determined by the extent of projection of said tuberous part from the ground, a cutter, and fluid-operated means mounted on said support and carrying said cutter, said fluid operated means being operable to support said cutter at a height corresponding to the position assumed by the sensing device in passing over a plant on which the cutter operates.

2. In a machine for topping tuberous plants, sensing mechanism comprising a foot adapted to ride over the tuberous part of a plant and to shift vertically to assume a position corresponding to the extent of projection thereof from the ground, an arm on the lower end of which said foot is carried, said arm projecting upwardly from the foot, a support, resilient means interposed between said support and said arm and supporting the sensing mechanism for riding movement of the foot over the tuberous part of a plant with very light pressure against said tuberous part and for vertical movement of the foot to assume a position determined by the extent of projection of said tuberous part from the ground, a cutter, a servomotor for supporting said cutter and moving it vertically, a valve for controlling said servomotor, and linkage connecting a movable part of said valve to said sensing mechanism and to a movable part of said servomotor so as to shift said valve part away from a neutral position in response to movement of said sensing mechanism and to thereby effect movement of said servomotor part until said valve part has been returned to said neutral position, thereby to adjust the position of the cutter to correspond to the adjustment of position of said foot.

3. In a machine for topping tuberous plants, a sensing device, means for carrying said sensing device along a row of plants in a position in which it will ride over the tuberous parts of the plants and shift vertically to assume a position corresponding to the extent of projection of a tuberous part from the ground, a cutter, a fluid-operated servomotor for supporting said cutter and moving the same vertically, a valve for controlling said servomotor, and linkage connecting a movable part of said valve to said sensing mechanism and to a movable part of said servomotor so as to shift said valve part away from a neutral position in response to movement of said sensing mechanism and to thereby effect movement of said servomotor part until said valve part has been returned to said neutral position, thereby to adjust the position of the cutter to correspond to the adjustment of position of said sensing device.

4. In a machine for topping tuberous plants growing in a row, a cutter comprising an oscillatable knife, a vertical shaft carrying said knife at its lower end, a bearing in which said shaft is journaled for oscillating and longitudinal sliding movements, supporting means on which said bearing is carried, sensing mechanism including a foot for engaging the tuberous parts of the plants, means extending upwardly from said foot and having a vertically slidable but non-rotatable connection with said bearing, a fluid servomotor having a piston connected to said cutter shaft for shifting the cutter vertically, and a control valve having a movable part linked to said sensing mechanism and to said shaft and responsive to movement of the sensing mechanism to control the fluid actuated movement of said piston in a manner to cause the cutter to follow the movements of said foot.

5. In a machine for topping tuberous plants, a cutter including an oscillatable knife, a vertical shaft carrying said knife at its lower end, means in which said shaft is supported for oscillating and vertical sliding movements, sensing mechanism including a foot adapted to ride over the tuberous parts of the plants and to shift vertically to assume positions determined by the extent of projection of said tuberous parts out of the ground, means extending upwardly from the rear extremity of said foot and having a vertically slidable and non-rotatable connection with said supporting means, a control valve having a movable part responsive to movement of said last-mentioned means, a fluid servomotor having a piston connected to said shaft and fluid-actuated in response to movements of said valve part to shift said knife in step with the shifting of said foot.

6. In a machine for topping tuberous plants growing in a row, sensing mechanism including a foot and means for yieldingly supporting the same for riding over the tuberous parts of the plants with light pressure thereagainst and for vertical movement to assume positions determined by the extent of projection of said tuberous parts from the ground, an oscillatable cutter, a fluid servomotor for supporting the cutter and moving it vertically, a control valve responsive to movements of said sensing device and in turn controlling the operation of the servomotor to shift the cutter vertically in a manner to follow the movements of the foot, a power plant having a rotating part, pitman means connecting said rotating means to the cutter for oscillating the cutter, and a hydraulic pump for supplying pressure fluid to said servomotor and valve, said pump being connected to said power plant and operated thereby.

7. A topping machine as defined in claim 6, in which said power plant is disposed rearwardly of said servomotor, said machine including means supporting said servomotor, sensing mechanism, cutter, and control valves for lateral shifting movement to permit the same to follow a plant row.

8. In a machine for topping tuberous plants, a sensing device, a vehicle for carrying said sensing device along a row of plants in a position in which it will ride over the tuberous parts of the plants, and shift vertically to assume a position corresponding to the extent of projection of a tuberous part from the ground, a cutter, fluid-operated means mounted on said vehicle and carrying said cutter, said fluid operated means being operable to support said cutter at a height corresponding to the position assumed by the sensing device in passing over a plant on which the cutter operates, and means carried by said vehicle for supporting said cutter and fluid operated means for lateral shifting movement to permit the same to automatically follow a plant row.

9. In a machine for topping tuberous plants, a sensing device, a vehicle for carrying said sensing device along a row of plants in a position in which it will ride over the tuberous parts of the plants, and shift vertically to assume a position corresponding to the extent of projection of a tuberous part from the ground, a cutter, and fluid-operated means mounted on said vehicle and carrying said cutter, said fluid operated means being operable to support said cutter at a height corresponding to the position assumed by the sensing device in passing over a plant on which the cutter operates, said sensing device, cutter and fluid operated supporting means being mounted directly in a tractor vehicle and including power takeoff means by which said cutter is driven from the engine of said tractor vehicle.

PAUL READ.

REFERENCES CITED

The following references are of record in the file of this patent:

UNITED STATES PATENTS

| Number | Name | Date |
|---|---|---|
| 773,279 | Dewey | Oct. 25, 1904 |
| 1,886,843 | Sherman | Nov. 8, 1932 |
| 1,931,815 | Conley | Oct. 24, 1933 |